US007672929B2

(12) United States Patent
Zelle

(10) Patent No.: US 7,672,929 B2
(45) Date of Patent: Mar. 2, 2010

(54) DATABASE MODIFICATION HISTORY

(75) Inventor: Nathan Zelle, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 891 days.

(21) Appl. No.: 11/024,584

(22) Filed: Dec. 22, 2004

(65) Prior Publication Data

US 2006/0136392 A1 Jun. 22, 2006

(51) Int. Cl.
*G06F 7/00* (2006.01)
*G06F 17/30* (2006.01)

(52) U.S. Cl. .................. 707/3; 707/202; 707/204

(58) Field of Classification Search .............. 707/1–10, 707/100–104.1, 200–206; 714/16, 20, 53, 714/54
See application file for complete search history.

(56) References Cited

U.S. PATENT DOCUMENTS

| 5,974,425 | A | 10/1999 | Obermarck | |
|---|---|---|---|---|
| 6,289,355 | B1 * | 9/2001 | Haderle et al. | 707/200 |
| 6,292,808 | B1 * | 9/2001 | Obermarck et al. | 707/202 |
| 6,598,059 | B1 | 7/2003 | Vasudevan | |
| 7,099,897 | B2 * | 8/2006 | Huras et al. | 707/202 |
| 2003/0172325 | A1 * | 9/2003 | Wyatt et al. | 714/53 |
| 2004/0073581 | A1 | 4/2004 | McVoy | |
| 2006/0074635 | A1 * | 4/2006 | Gilbert et al. | 704/9 |

OTHER PUBLICATIONS

Vaisman et al., Enhancing Web access using data mining techniques, Sep. 1-5, 2003, IEEE, 327-331.*
Sandsta et al., Improving the access time performance of serpentine tape drives, Mar. 23-26, 1999, IEEE, 542-551.*

* cited by examiner

*Primary Examiner*—Jean B Fleurantin

(57) ABSTRACT

A database system including an encoder module and a revision control archive module is disclosed. The encoder module receives signals representing a database access request, generates database access commands, and executes the database access command against a revision control archive module if the database access command causes a change to a data record in the database.

16 Claims, 4 Drawing Sheets

DATABASE MODIFICATION HISTORY

TECHNICAL FIELD

The systems and methods described herein relate to computer systems, and more particularly to database modification history.

BACKGROUND

Computer database systems and user interfaces associated with them have evolved into complex software systems. Conventional relational database systems store information in tables, each of which includes a plurality of rows and columns. Information is stored in the database in one or more records, which correspond to one or more fields in the database tables.

Databases are managed by database management systems (DBMSs). A DBMS typically includes an interface that permits a user or an application to submit a query to the database. The DBMS then processes the query and returns the records corresponding to the query or updates the records corresponding to the query. The DBMS may also include a revision control archive module that records changes to the database contents, and may also record information associated with the changes such as, e.g., when the change was made and by whom.

Continued improvements in DBMSs are desirable.

SUMMARY

In an exemplary embodiment a method of operating a database management system comprises receiving a signal representing a database access request; generating a database access command; and executing the database access command against a revision control archive module if the database access command causes a change to a data record in the database.

DETAILED DESCRIPTION

Described herein are exemplary system and methods for managing a database system. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Exemplary Database Management System

Figure 1:
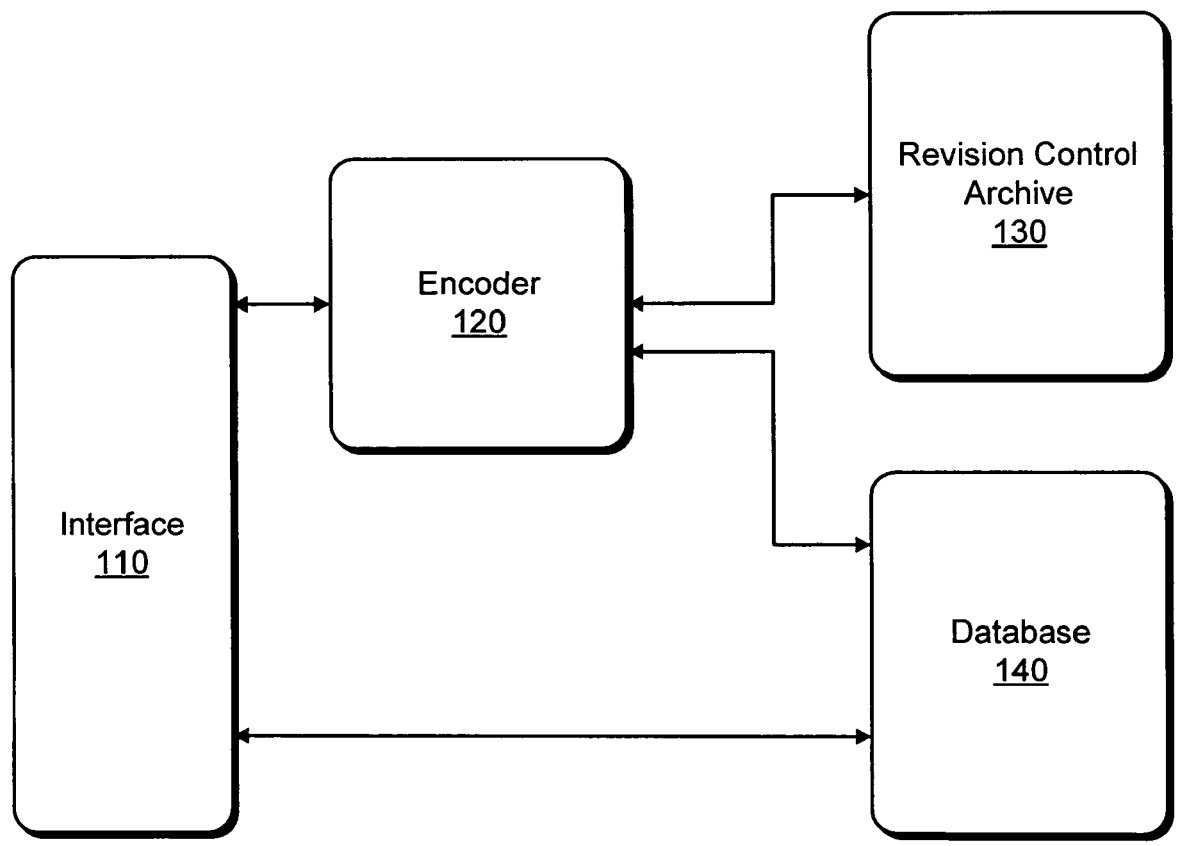
FIG. 1 is a block diagram of an exemplary embodiment of a database management system.

FIG. 1 is a block diagram of the software architecture of a database management system 100 constructed in accordance with the present description. The database management system 100 includes an interface module 110, an encoder 120, a database 140, and a revision control archive 130, each of which may be implemented as a software module executable on a suitable processor.

In an exemplary embodiment, the interface module 110 may be implemented as a user interface that enables users to interact with the database management system 100. In alternate embodiments the interface module 110 may be implemented as an interface with one or more application programs. Interface module 110 is communicatively connected to an encoder module 120. Operation of the encoder module 120 is explained in greater detail below.

Encoder module 120 is communicatively connected to a database 140 and a revision control archive 130. The particular operation of database 140 is not critical; database 140 may be implemented as a conventional relational database or any other type of database. Revision control archive 130 records changes made to database 140. Revision control archive 130 may itself be implemented as a database, the records of which contain information relating to changes in records of database 140.

Figure 2:
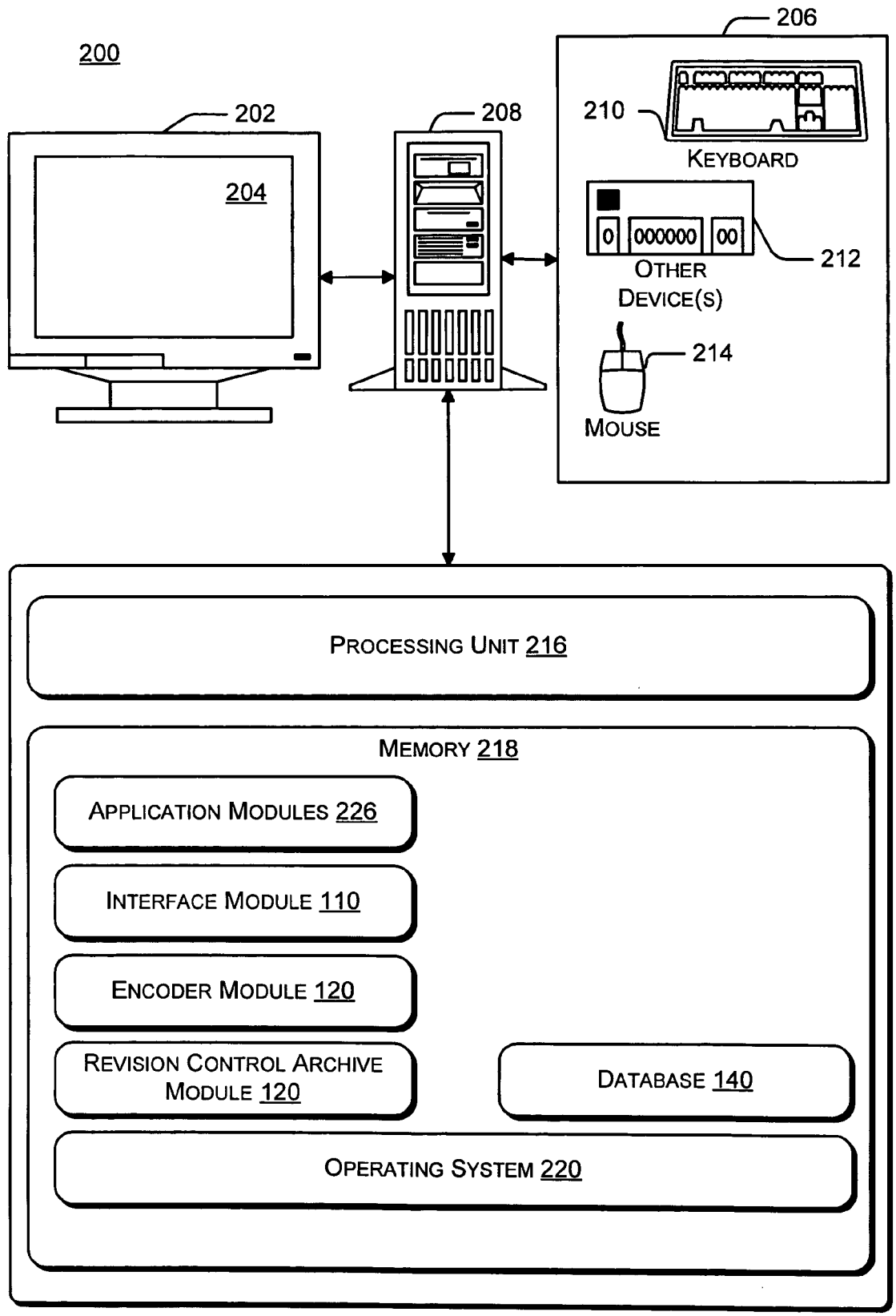
FIG. 2 is a schematic illustration of an exemplary embodiment of a database management system including an exemplary operating environment.

FIG. 2 is a schematic illustration of an exemplary computer system 200 adapted to include a database management system 100. This computer system 200 includes a display 202 having a screen 204, one or more user-input devices 206, and a computer 208. The user-input devices 206 can include any device allowing a computer to receive a developer's input, such as a keyboard 210, other device(s) 212, and a mouse 214. The other device(s) 212 can include a touch screen, a voice-activated input device, a track ball, and any other device that allows the system 200 to receive input from a developer and/or a user. The computer 208 includes a processing unit 216 and random access memory and/or read-only memory 218.

Memory 218 includes an operating system 220 for managing operations of computer 208. In an exemplary embodiment one or more application modules 226 executable on the processing unit 216 reside in memory 218. Memory 218 further includes interface module 110, encoder module 120, revision control archive module 130, and a database 140. Operation of the system 200 is explained in greater detail below.

Exemplary Embodiments of Operations

Figure 3:
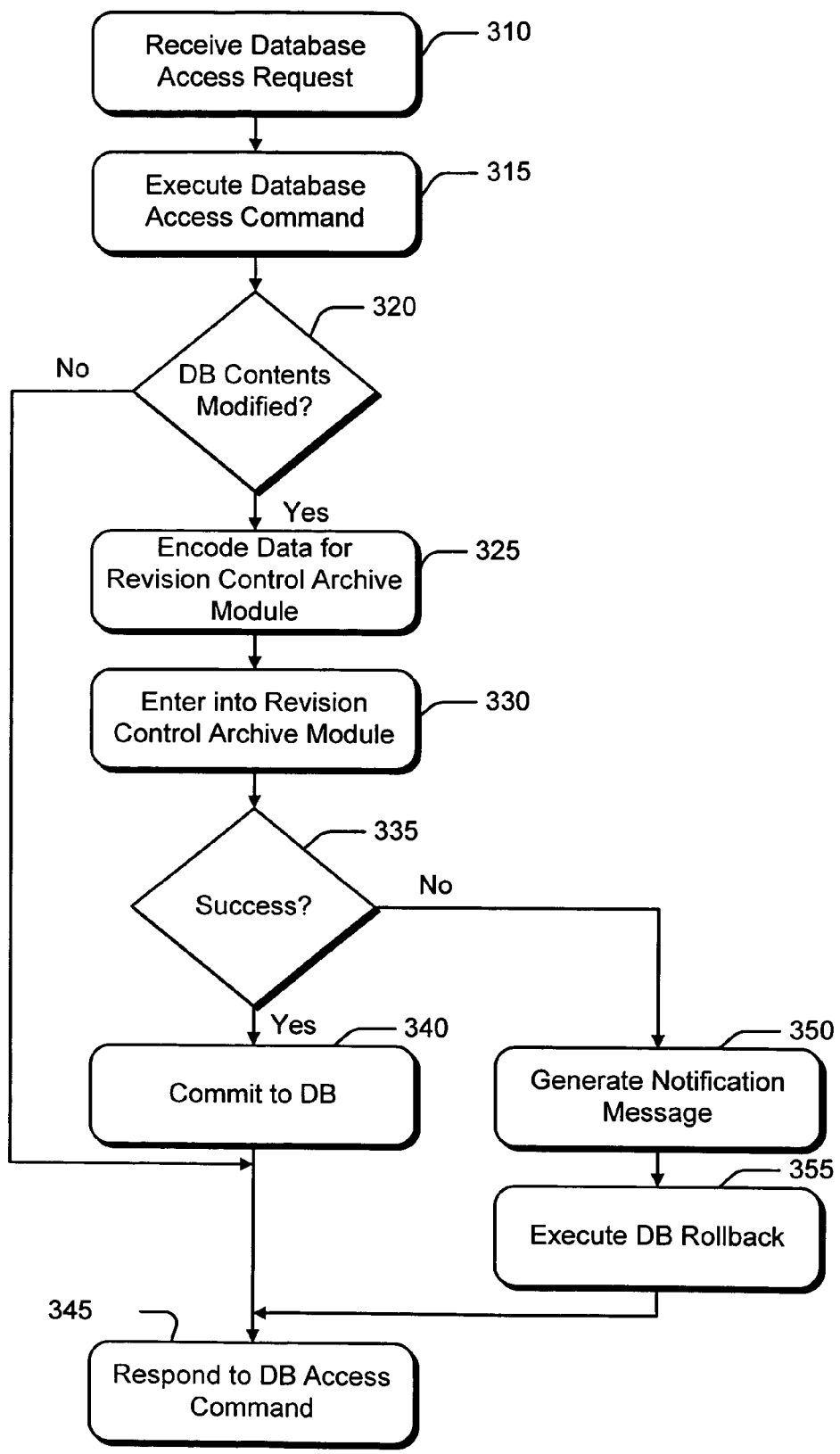
FIG. 3 is a flowchart illustrating operations in an exemplary embodiment of a method for operating a database management system.

FIG. 3 is a flowchart illustrating operations in an exemplary method for recording database modification history. In one embodiment, database operations received by an interface are passed to an encoder module, which determines whether the database operations will cause a change in the database contents. Database operations that do not cause a change in database contents are passed to the database for execution. By contrast, database operations that that will affect a change in database contents are encoded by the encoder module and passed contemporaneously to the database and to a revision control archive module, which logs database changes. Changes to data in the database are committed only after the encoder module receives an acknowledgment from the revision control archive indicating that the data has stored successfully in the revision control archive.

Referring to FIG. 3, at operation 310 a database access request is received at the encoder module 120. The database access request may have been generated by an interface module 110 such as, e.g., a user interface with a human operator or an interface with another software module. At operation 315 the database access command is executed, e.g., by passing the database access command to the database module 140.

At operation 320 it is determined whether the received command modifies the contents of the data in the database. If the received command does not modify the contents of the database (e.g., if the received command exclusively retrieves information from the database) then control passes to operation 345 and the encoder module responds to the database access command, e.g., by returning the results of the database access command to the interface module 110.

By contrast, if at operation 320 it is determined that the received command modifies the contents of the database (e.g., if the command is a write command or a delete command), then control passes to operation 325 and the data is encoded into a form suitable for the revision control archive module. In an exemplary embodiment the data may be converted into a format that is compatible with the revision control archive module. Relevant additional data such as, e.g., a transaction number, a timestamp, and an identifier associated with a user or application that generated the database command may be appended to the data.

At operation 330 the data is passed to the revision control archive module 130, which enters the data into its records and transmits a response to the encoder module 120. If, at operation 335, the response indicates that the data was successfully recorded in the revision control archive module 130, then control passes to operation 340 and the encoder module 120 generates a command to the database module 140 that causes the database module 140 to commit the changes made to the database.

By contrast, if at operation 335 the response from the revision control archive module 130 indicates that the data was not successfully recorded in the revision control archive module 130, then control passes to operation 350 and the encoder module 120 generates a notification message indicating that the data was not successfully entered into the database system. This notification message may be transmitted to the interface module 110, which in turn may present the message to the user or application that is generated the database command. In addition, at operation 355 the encoder module 120 generates a command to execute a rollback of the database data changes, which may be transmitted to the database module. In response to the command, the database module rolls back any changes made to the data in the database resulting from the database command. In practice, many database systems hold database changes in cache memory until receiving a separate command instructing the database to commit the changes to a permanent storage medium. In such as system rolling back the changes only requires deleting the changes from the cache memory. Control may then pass back to operation 345, in which a response to the database access command is generated. In an exemplary embodiment, the response may be the notification message generated in operation 350.

The operations of FIG. 3 enable the encoder module 120 to manage data I/O operations with the database module 140 and the revision control archive module 130. In an alternate embodiment database modifications may be committed to the database (operation 340) before determining whether the data was successfully recorded in the revision control archive module.

Exemplary Computer Environment

Figure 4:
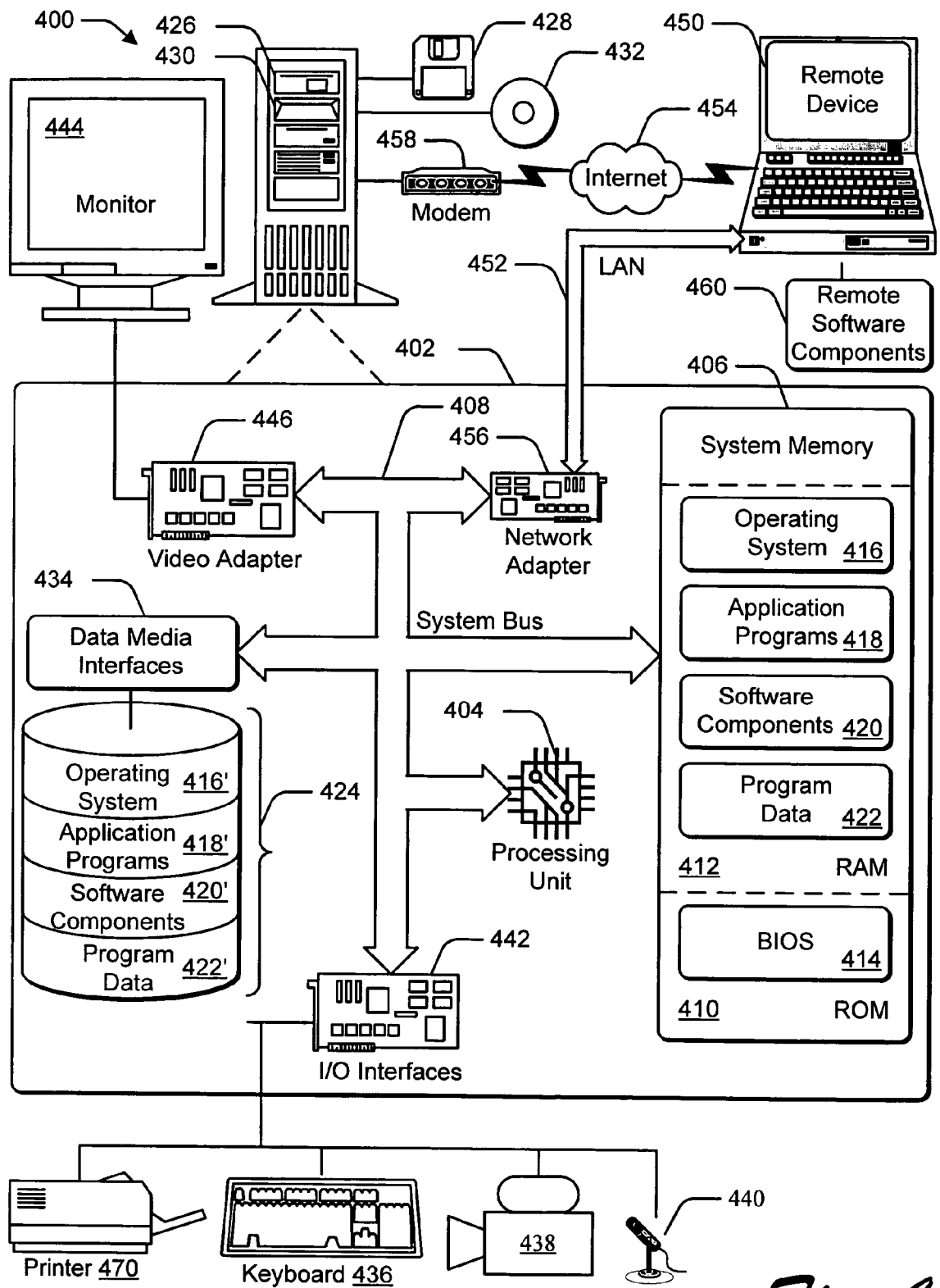
FIG. 4 is a diagram of an exemplary embodiment of a computing system in which the present invention may be implemented.

The various components and functionality described herein are implemented with a number of individual computers. FIG. 4 shows components of typical example of such a computer, referred by to reference numeral 400. The components shown in FIG. 4 are only examples, and are not intended to suggest any limitation as to the scope of the functionality of the invention; the invention is not necessarily dependent on the features shown in FIG. 4.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions, programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 4, the components of computer 400 may include, but are not limited to, a processing unit 404, a system memory 406, and a system bus 408 that couples various system components including the system memory 406 to the processing unit 404. The system bus 408 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus.

Computer 400 typically includes a variety of computer-readable media. Computer-readable media can be any available media that can be accessed by computer 400 and includes both volatile and nonvolatile media, removable and non-removable media. By way of example, and not limitation, computer-readable media may comprise computer storage media and communication media. "Computer storage media"

includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 400. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network, fiber optic networks, or direct-wired connection and wireless media such as acoustic, RF, infrared and other wireless media. Combinations of any of the above should also be included within the scope of computer readable media.

The system memory 406 includes computer storage media in the form of volatile and/or nonvolatile memory such as read only memory (ROM) 410 and random access memory (RAM) 412. A basic input/output system 414 (BIOS), containing the basic routines that help to transfer information between elements within computer 400, such as during start-up, is typically stored in ROM 410. RAM 412 typically contains data and/or program modules that are immediately accessible to and/or presently being operated on by processing unit 404. By way of example, and not limitation, FIG. 4 illustrates operating system 416, application programs 418, other software components 420, and program data 422.

The computer 400 may also include other removable/non-removable, volatile/nonvolatile computer storage media. By way of example only, the computer system of FIG. 4 may include a hard disk drive 424 that reads from or writes to non-removable, nonvolatile magnetic media, a magnetic disk drive 426 that reads from or writes to a removable, nonvolatile magnetic disk 428, and an optical disk drive 430 that reads from or writes to a removable, nonvolatile optical disk 432 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 424 is typically connected to the system bus 408 through a non-removable memory interface such as data media interface 434, and magnetic disk drive 426 and optical disk drive 430 are typically connected to the system bus 408 by a removable memory interface.

The drives and their associated computer storage media discussed above and illustrated in FIG. 4 provide storage of computer-readable instructions, data structures, program modules, and other data for computer 400. In FIG. 4, for example, hard disk drive 424 is illustrated as storing operating system 416', application programs 418', software components 420', and program data 422'. Note that these components can either be the same as or different from operating system 416, application programs 418, software components 420, and program data 422. Operating system 416, application programs 418, other program modules 420, and program data 422 are given different numbers here to illustrate that, at a minimum, they are different copies. A user may enter commands and information into the computer 400 through input devices such as a keyboard 436 and pointing device 438, commonly referred to as a mouse, trackball, or touch pad. Other input devices (not shown) may include a microphone 440, joystick, game pad, satellite dish, scanner, or the like. These and other input devices are often connected to the processing unit 404 through an input/output (I/O) interface 442 that is coupled to the system bus, but may be connected by other interface and bus structures, such as a parallel port, game port, or a universal serial bus (USB). A monitor 444 or other type of display device is also connected to the system bus 406 via an interface, such as a video adapter 446. In addition to the monitor 444, computers may also include other peripheral output devices (e.g., speakers) and one or more printers 470, which may be connected through the I/O interface 442.

The computer may operate in a networked environment using logical connections to one or more remote computers, such as a remote computing device 450. The remote computing device 450 may be a personal computer, a server, a router, a network PC, a peer device or other common network node, and typically includes many or all of the elements described above relative to computer 400. The logical connections depicted in FIG. 4 include a local area network (LAN) 452 and a wide area network (WAN) 454. Although the WAN 454 shown in FIG. 4 is the Internet, the WAN 454 may also include other networks. Such networking environments are commonplace in offices, enterprise-wide computer networks, intranets, and the like.

When used in a LAN networking environment, the computer 400 is connected to the LAN 452 through a network interface or adapter 456. When used in a WAN networking environment, the computer 400 typically includes a modem 458 or other means for establishing communications over the Internet 454. The modem 458, which may be internal or external, may be connected to the system bus 406 via the I/O interface 442, or other appropriate mechanism. In a networked environment, program modules depicted relative to the computer 400, or portions thereof, may be stored in the remote computing device 450. By way of example, and not limitation, FIG. 4 illustrates remote application programs 460 as residing on remote computing device 450. It will be appreciated that the network connections shown are exemplary and other means of establishing a communications link between the computers may be used.

CONCLUSION

Although the described arrangements and procedures have been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter.

What is claimed is:

1. A computer implemented method of operating a database management system, comprising:
   receiving, in a database encoder module, a signal representing a database access command;
   executing the database access command against a database;
   determining whether the database access command caused a change to the database; and changing at least one data record in a revision control archive module in a computer-readable storage medium in response to a determination that the database access command caused a change to the database, wherein changing at least one data record in a revision control archive module comprises:
  encoding data associated with the database access command for entry into a revision control archive module; and
  submitting the data to the revision control archive module; and
committing a change to the database record only if the change is successfully recorded in the revision control archive module.

2. The computer implemented method of claim 1, wherein receiving a signal representing a database access command comprises receiving a signal from an interface module.

3. The computer implemented method of claim 1, further comprising determining whether the database access command writes data to a record in the database module.

4. The computer implemented method of claim 1, further comprising determining whether the database access command deletes data from a record in the database module.

5. The computer implemented method of claim 1, further comprising generating a notification message if the revision control archive module fails to record the data.

6. A computer implemented method of operating a database management system, comprising:
  receiving, in a database encoder module, a request to modify a database;
  executing the request against the database;
  encoding the request into a format compatible with a revision control archive module;
  changing at least one data record in the revision control archive module in a computer-readable storage medium, wherein changing at least one data record in a revision control archive module comprises:
    encoding data associated with the database access command for entry into a revision control archive module; and
    submitting the data to the revision control archive module; and
  committing a requested change to a database only when the request is successfully executed by the revision control archive module.

7. The computer implemented method of claim 6, wherein receiving a request to modify the contents of a database comprises receiving a signal from an interface module.

8. The computer implemented method of claim 6, wherein committing a requested change to a database only when the request is successfully executed by the revision control archive module comprises:
  receiving a response from the revision control archive module;
  generating a command to commit the requested change to the database if the response indicates success; and
  generating a command to roll back the requested change if the response indicates failure; and
  transmitting the command to roll back the requested change to the database.

9. One or more computer-readable storage media comprising logic instructions stored on the computer-readable storage media which, when executed by a processor, configure the processor to:
  receive a signal representing a database access command;
  generate a database access command; and
  execute the database access command against a database;
  determine whether the database access command caused a change to the database; and
  change at least one data record in a revision control archive module in response to a determination that the database access command caused a change to the database;
  encode data associated with the database access command for entry into a revision control archive module;
  submit the data to the revision control archive module; and
  commit a change to the database record only if the change is successfully recorded in the revision control archive module.

10. The computer-readable storage media of claim 9, further comprising logic instructions stored on the computer-readable storage media which, when executed by a processor, configure the processor to receive a signal representing a database access request comprises receiving a signal from an interface module.

11. The computer-readable storage media of claim 9, further comprising logic instructions stored on the computer-readable storage media which, when executed by a processor, configure the processor to determine whether the database access command writes data to a record in the database module.

12. The computer-readable storage media of claim 9, further comprising logic instructions stored on the computer-readable storage media which, when executed by a processor, configure the processor to determine whether the database access command deletes data from a record in the database module.

13. The computer-readable storage media of claim 9, further comprising logic instructions stored on the computer-readable storage media which, when executed by a processor, configure the processor to generate a notification message if the revision control archive module fails to record the data.

14. A database management system, comprising:
  a processor;
  a memory module communicatively connected to the processor and comprising logic instructions recorded in a computer readable storage medium that, when executed by the processor, configure the processor to:
    receive, in a database encoder module, a request to modify a database;
    execute the request against the database;
    encode the request into a format compatible with a revision control archive module;
    encode data associated with the database access command for entry into a revision control archive module;
    submit the data to the revision control archive module;
    change at least one data record in the revision control archive module; and
    commit a requested change to a database only when the request is successfully executed by the revision control archive module.

15. The database management system of claim 14, further comprising logic instructions recorded in a computer readable storage medium which, when executed by the processor, configure the processor to receive a signal from an interface module.

16. The database management system of claim 14 further comprising logic instructions recorded in a computer readable storage medium which, when executed by the processor, configure the processor to:
  receive a response from the revision control archive module;

generate a command to commit a requested change to the database if the response indicates success; and generate a command to roll back a requested change if the response indicates failure; and transmit the command to roll back the requested change to the database.

* * * * *